US012586819B2

(12) United States Patent
Lee et al.

(10) Patent No.: US 12,586,819 B2
(45) Date of Patent: Mar. 24, 2026

(54) NON-AQUEOUS ELECTROLYTE AND LITHIUM SECONDARY BATTERY INCLUDING THE SAME

(71) Applicant: LG Energy Solution, Ltd., Seoul (KR)

(72) Inventors: Kyung Mi Lee, Daejeon (KR); Chul Haeng Lee, Daejeon (KR); Jung Min Lee, Daejeon (KR); Su Hyeon Ji, Daejeon (KR); Chul Eun Yeom, Daejeon (KR); Yoon Gyo Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/713,296

(22) PCT Filed: Aug. 3, 2023

(86) PCT No.: PCT/KR2023/011447
§ 371 (c)(1),
(2) Date: May 24, 2024

(87) PCT Pub. No.: WO2024/029973
PCT Pub. Date: Feb. 8, 2024

(65) Prior Publication Data

US 2024/0429445 A1 Dec. 26, 2024

(30) Foreign Application Priority Data

Aug. 4, 2022 (KR) ........................ 10-2022-0097613
Aug. 3, 2023 (KR) ........................ 10-2023-0101719

(51) Int. Cl.

| | |
|---|---|
| ***H01M 10/0567*** | (2010.01) |
| ***H01M 4/38*** | (2006.01) |
| ***H01M 4/525*** | (2010.01) |
| ***H01M 10/0568*** | (2010.01) |
| ***H01M 10/0569*** | (2010.01) |
| *H01M 4/02* | (2006.01) |

(52) U.S. Cl.
CPC ....... *H01M 10/0567* (2013.01); *H01M 4/386* (2013.01); *H01M 4/525* (2013.01); *H01M 10/0568* (2013.01); *H01M 10/0569* (2013.01); *H01M 2004/027* (2013.01); *H01M 2004/028* (2013.01); *H01M 2300/0037* (2013.01); *H01M 2300/0051* (2013.01)

(58) Field of Classification Search
CPC ................. H01M 4/386; H01M 4/525; H01M 10/0567–0569; H01M 2004/027; H01M 2004/028; H01M 2300/0037; H01M 2300/0051
See application file for complete search history.

(56) References Cited

U.S. PATENT DOCUMENTS

| | | | | |
|---|---|---|---|---|
| 8,308,971 | B1 | 11/2012 | Bhat et al. | |
| 2006/0269846 | A1* | 11/2006 | Xu .................... | H01M 10/0525 429/339 |
| 2010/0248021 | A1 | 9/2010 | Park et al. | |
| 2012/0291264 | A1 | 11/2012 | Xu et al. | |
| 2012/0315534 | A1 | 12/2012 | Bhat et al. | |
| 2012/0315536 | A1 | 12/2012 | Bhat et al. | |
| 2014/0113186 | A1 | 4/2014 | Bhat et al. | |
| 2014/0295219 | A1 | 10/2014 | Bhat et al. | |
| 2014/0356735 | A1 | 12/2014 | Pena Hueso et al. | |
| 2016/0268635 | A1 | 9/2016 | Cha | |
| 2016/0351946 | A1 | 12/2016 | Pena Hueso et al. | |
| 2018/0076477 | A1 | 3/2018 | Pena Hueso et al. | |
| 2020/0388837 | A1* | 12/2020 | Ji ...................... | H01M 10/0525 |
| 2022/0021029 | A1 | 1/2022 | Oh et al. | |
| 2022/0059832 | A1 | 2/2022 | Han et al. | |
| 2022/0181674 | A1 | 6/2022 | Pena Hueso et al. | |

FOREIGN PATENT DOCUMENTS

| | | | |
|---|---|---|---|
| CN | 108306048 | A | 7/2018 |
| CN | 109888388 | A | 6/2019 |
| CN | 109346761 | B | 3/2021 |
| CN | 113130990 | A | 7/2021 |
| CN | 113540561 | A | 10/2021 |
| JP | 2000223152 | A | 8/2000 |
| JP | 2022508147 | A | 1/2022 |
| KR | 101002651 | B1 | 12/2010 |
| KR | 20160109664 | A | 9/2016 |
| KR | 20170028676 | A | 3/2017 |
| KR | 101800497 | B1 | 11/2017 |
| KR | 20200126336 | A | 11/2020 |
| KR | 102188545 | B1 | 12/2020 |
| WO | 2022138893 | A1 | 6/2022 |

OTHER PUBLICATIONS

Swindell, R et al., "Hexafluoropropylideniminolithium Reactions with Halides," Inorganic Chemistry, Feb. 1972, vol. 11 No. 2, 4 pages.

(Continued)

*Primary Examiner* — Osei K Amponsah
(74) *Attorney, Agent, or Firm* — Lerner David LLP

(57) ABSTRACT

Provided is a non-aqueous electrolyte comprising a lithium salt; an organic solvent; and a compound represented by Formula 1 as an additive:

[Formula 1]

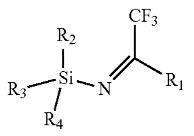

wherein in Formula 1, $R_1$ may be an alkyl group having 1 to 5 carbon atoms and optionally being substituted with fluorine, an aryl group having 6 to 8 carbon atoms and optionally being substituted with fluorine, or a nitrile group; and $R_2$ to $R_4$ are each independently an alkyl group having 1 to 5 carbon atoms.

14 Claims, No Drawings

(56) References Cited

OTHER PUBLICATIONS

International Search Report for Application No. PCT/KR2023/011447 mailed Oct. 31, 23. 3 pages.
Extended European Search Report including Written Opinion for Application No. 23850473.2 dated Mar. 14, 25, pp. 1-7.

* cited by examiner

NON-AQUEOUS ELECTROLYTE AND LITHIUM SECONDARY BATTERY INCLUDING THE SAME

CROSS-REFERENCE TO RELATED APPLICATIONS

This application is a national stage entry under 35 U.S.C. § 371 of International Application No. PCT/KR2023/011447 filed on Aug. 3, 2023, which claims priority from Korean Patent Application No. 10-2022-0097613 filed on Aug. 4, 2022, and Korean Patent Application No. 10-2023-0101719 filed on Aug. 3, 2023, all the disclosures of which are incorporated by reference herein.

TECHNICAL FIELD

The present disclosure relates to a non-aqueous electrolyte and a lithium secondary battery including the same.

BACKGROUND ART

Recently, there is a growing demand for high-capacity, high-output and high-stability secondary batteries as the application area of lithium secondary batteries has rapidly expanded to various technological fields.

Particularly, when a secondary battery is driven at a high voltage, as charge and discharge proceeds, a film formed on surfaces of positive/negative electrodes or the surface structure of an electrode is deteriorated by a side reaction caused by the deterioration of an electrolyte, so that transition metal ions may be eluted from the surface of the positive electrode. As described above, the eluted transition metal ions are electro-deposited on the negative electrode and cause the passivation capability of SEI to degrade, so that there is a problem in that the negative electrode is deteriorated.

The deterioration phenomenon of a secondary battery tends to accelerate when the potential of a positive electrode increases, or when the battery is exposed to high temperatures.

In addition, when a lithium ion battery is continuously used for a long period of time or left to stand at high temperatures, gas is generated and causes a so-called swelling phenomenon in which the thickness of the battery increases, and it is known that the amount of gas generated at this time depends on the state of the SEI.

Therefore, in order to solve the above problem, research and development are being conducted on methods capable of suppressing the elution of metal ions from a positive electrode and forming a stable SEI film on a negative electrode, thereby reducing the swelling phenomenon of a secondary battery, and increasing the stability at high temperatures.

Technical Problem

As a result of conducting diverse research to solve the above problem, the present disclosure aims to provide an additive for a non-aqueous electrolyte capable of suppressing the degradation of a positive electrode, reducing side reactions between a positive electrode and an electrolyte, and forming a stable SEI film on a negative electrode.

Furthermore, the present disclosure aims to provide a non-aqueous electrolyte having improved stability at high temperatures by including the additive for a non-aqueous electrolyte.

Furthermore, the present disclosure aims to provide a lithium secondary battery with improved overall performance by having improved high-temperature cycle properties and high-temperature storage properties by including the non-aqueous electrolyte.

Technical Solution

To achieve the above object, the present disclosure provides a non-aqueous electrolyte including an additive for a non-aqueous electrolyte represented by Formula 1 below.

[Formula 1]

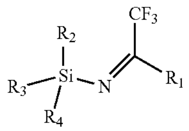

In Formula 1 above, $R_1$ may be an alkyl group having 1 to 5 carbon atoms and optionally being substituted with fluorine, an aryl group having 6 to 8 carbon atoms and optionally being substituted with fluorine, or a nitrile group. $R_2$ to $R_4$ are each independently an alkyl group having 1 to 5 carbon atoms.

Furthermore, the present disclosure provides a lithium secondary battery including the non-aqueous electrolyte.

Advantageous Effects

HF generated as a by-product when operating a secondary battery accelerates the collapse of the positive electrode and negative electrode, this leads to the swelling problem of the secondary battery, which causes the lifespan and storage characteristics of the secondary battery to deteriorate.

The compound represented by Formula 1, which is provided as the additive for a non-aqueous electrolyte of the present disclosure, contains an acetimidoyl group coupled to a silyl group in its structure. That is, the compound represented by Formula 1 of the present disclosure has a $CF_3$ group near the Si—N bond and has high binding energy to HF, and thus can effectively scavenge HF.

In addition, the compound represented by Formula 1 may form a stable solid electrolyte interphase (SEI) on a surface of the negative electrode while minimizing an increase in the resistance of the lithium secondary battery. Thus, it is possible to suppress the degradation of the passivation ability of the SEI at high temperatures, which prevents the deterioration of the negative electrode, thereby improving the lifespan of the battery.

Therefore, if the non-aqueous electrolyte of the present disclosure comprising the compound of Formula 1 is used, it is possible to form an electrode-electrolyte interface that is stable even at high temperatures and has low resistance, thereby enhancing high-temperature cycle characteristics and high-temperature storage characteristics. Thus, a lithium secondary battery with improved overall performance may be achieved.

DETAILED DESCRIPTION

It will be understood that terms or words used in the present specification and claims shall not be construed as being limited to having meanings defined in commonly used dictionaries, but should be interpreted as having meanings and concepts consistent with the technical idea of the present disclosure based on the principle that an inventor may appropriately define concepts of the terms to best explain the disclosure.

In the present specification, it should be understood that the terms "include," "comprise," or "have" are intended to specify the presence of stated features, numbers, steps, elements, or combinations thereof, but do not preclude the presence or addition of one or more other features, numbers, steps, elements, or combinations thereof.

In addition, in the present specification, it will be understood that in the description of "carbon atoms a to b" herein, "a" and "b" refer to the number of carbon atoms included in a specific functional group. That is, the functional group may include "a" to "b" number of carbon atoms. For example, an "alkylene group having 1 to 5 carbon atoms" refers to an alkylene group including carbon atoms with a carbon number of 1 to 5, that is, $—CH_2—$, $—CH_2CH_2—$, $—CH_2CH_2CH_2—$, $—CH_2$ $(CH_3)$ $CH—$, $—CH(CH_3)CH_2—$, $—CH(CH_3)CH_2CH_2—$, and the like.

In addition, in the present disclosure, the term "alkyl group" refers to a substituted or unsubstituted group. Also, unless otherwise defined in the specification, the expression "substitution" denotes that at least one hydrogen bonded to carbon is substituted with an element other than hydrogen; for example, it refers to being substituted with an alkyl group having 1 to 20 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, a heterocycloalkyl group having 3 to 12 carbon atoms, heterocycloalkenyl group having 3 to 12 carbon atoms, aryloxy group having 6 to 12 carbon atoms, a halogen atom, a fluoroalkyl group having 1 to 20 carbon atoms, a nitro group, an aryl group having 6 to 20 carbon atoms, a haloaryl group having 6 to 20 carbon atoms, etc.

Hereinafter, the present disclosure will be described in more detail.

Non-Aqeuous Electrolyte

The non-aqueous electrolyte according to the present disclosure includes a compound represented by Formula 1 below as an additive. A lithium secondary battery using the non-aqueous electrolyte including the additive of the present disclosure may have excellent high-temperature cycle properties and high-temperature storage properties since deterioration caused by interfacial reactions at high temperatures are suppressed.

[Formula 1]

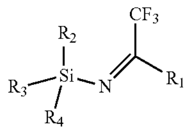

The compound represented by Formula 1 above contains an acetimidoyl group coupled to a silyl group in its structure, and thus is capable of effectively scavenging as it has a high binding energy to HF.

The compound of Formula 1 above is capable of forming a stable solid electrolyte interphase (SEI) film on the surface of a negative electrode while minimizing an increase in the resistance of a lithium secondary battery. Therefore, it is possible to suppress the degradation in the passivation ability of SEI at high temperatures, thereby preventing the negative electrode from deteriorating.

In Formula 1 above, $R_1$ may be an alkyl group having 1 to 5 carbon atoms and optionally being substituted with fluorine, an aryl group having 6 to 8 carbon atoms and optionally being substituted with fluorine, or a nitrile group.

$R_2$ to $R_4$ are each independently an alkyl group having 1 to 5 carbon atoms.

Specifically, in Formula 1 above, $R_1$ may be $CF_3$ or a nitrile group. In addition, the compound of Formula 1 above may be a compound represented by Formula 1-1 below.

[Formula 1-1]

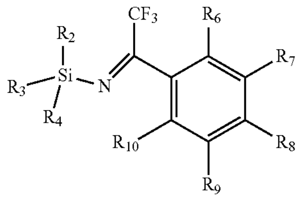

In Formula 1-1 above, $R_2$ to $R_4$ are each independently an alkyl group having 1 to 5 carbon atoms.

In Formula 1-1 above, $R_6$ to $R_{10}$ may each independently be H or F. Preferably, when at least one of $R_6$ to $R_{10}$ is F, the effect of scavenging HF effect may be superior.

Specifically, the compound of Formula 1 of the present disclosure may be represented by any one selected from Formulas 1a to 1c below.

[Formula 1a]

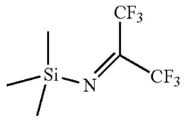

[Formula 1b]

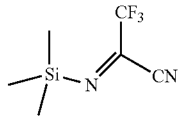

[Formula 1c]

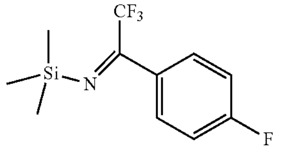

An additive for a non-aqueous electrolyte according to the present disclosure may be included in an amount of 0.1 parts by weight to 4 parts by weight, preferably 0.1 parts by weight to 2.5 parts by weight, more preferably 0.2 parts by weight to 1.5 parts by weight, based on 100 parts by weight of the non-aqueous electrolyte. When the content of the compound represented by Formula 1 above satisfies the above range, a sufficient amount of a film may be formed and the viscosity of the electrolyte may be maintained at a suitable level, thereby achieving an effect of having excellent rate properties or capacity properties during high-temperature storage.

The lithium salt included in the non-aqueous electrolyte according to the present disclosure is used as an electrolyte salt in a lithium secondary battery, and is used as a medium for transferring ions. Typically, the lithium salt may include $Li^+$ as cations, and may include at least one of $F^-$, $Cl^-$, $Br^-$, $I^-$, $NO_3^-$, $N(CN)_2^-$, $BF_4^-$, $ClO_4^-$, $B_{10}Cl_{10}^-$, $AlCl_4^-$, $AlO_2^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $C_4F_9SO_3^-$, $CF_3CF_2SO_3^-$, $CF_3CF_2$ $(CF_3)_2CO^-$, $(CF_3SO_2)_2CH^-$, $CF_3$ $(CF_2)_7SO_3^-$ or $SCN^-$ as anions.

Specifically, the lithium salt may include a single material selected from LiCl, LiBr, LiI, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$ (lithium bis(fluorosulfonyl)imide (LiFSI)), $LiN(SO_2CF_2CF_3)_2$ (lithium bis (perfluoroethanesulfonyl)imide (LiBETI) or $LiN(SO_2CF_3)_2$ (lithium bis(trifluoromethane)sulfonyl)imide (LiTFSI) or a mixture of two or more thereof. In addition to the above, any lithium salt commonly used in an electrolyte of a lithium secondary battery may be used without limitation.

The lithium salt may be appropriately changed in a normally usable range, but in order to obtain an optimum effect of forming an anti-corrosive film on the surface of an electrode, the lithium salt may be included in the electrolyte at a concentration of 0.5 M to 3 M, preferably 0.5 M to 2.5 M, and more preferably 0.8 M to 2 M. When the concentration of the lithium salt satisfies the above range, there is a sufficient effect of improving cycle properties during the high-temperature storage of a lithium secondary battery, and the viscosity of the non-aqueous electrolyte is suitable so that the wettability of the electrolyte may be improved.

The organic solvent included in the non-aqueous electrolyte of the present disclosure may include at least one of a cyclic carbonate-based organic solvent, a linear carbonate-based organic solvent, a linear ester-based organic solvent, or a cyclic ester-based organic solvent.

Specifically, the organic solvent may include a cyclic carbonate-based organic solvent, a linear carbonate-based organic solvent, or a mixed organic solvent thereof.

The cyclic carbonate-based organic solvent is an organic solvent having high viscosity and a high dielectric constant, and thus, is an organic solvent capable of dissociating a lithium salt well in an electrolyte, and specific examples thereof may include at least one of ethylene carbonate (EC), propylene carbonate (PC), 1,2-butylene carbonate, 2,3-butylene carbonate, 1,2-pentylene carbonate, 2,3-pentylene carbonate, or vinylene carbonate, and among them, may include ethylene carbonate.

In addition, the linear carbonate-based organic solvent is an organic solvent having low viscosity and a low dielectric constant, and typical examples thereof may include at least one of dimethyl carbonate (DMC), diethyl carbonate (DEC), dipropyl carbonate, ethylmethyl carbonate (EMC), methylpropyl carbonate, or ethylpropyl carbonate, and specifically, may include ethylmethyl carbonate (EMC).

In addition, in order to prepare an electrolyte having a high ion conductivity, the organic solvent may include at least one carbonate-based organic solvent selected from the cyclic carbonate-based organic solvent or the linear carbonate-based organic solvent and at least one ester-based organic solvent selected from the linear ester-based organic solvent or the cyclic ester-based organic solvent.

Specific examples of the linear ester-based organic solvent may include at least one of methyl acetate, ethyl acetate, propyl acetate, methyl propionate, ethyl propionate, propyl propionate, or butyl propionate.

In addition, the cyclic ester-based organic solvent may be at least one of γ-butyrolactone, γ-valerolactore, γ-caprolactore, σ-valerolactone, or ε-caprolactone.

Meanwhile, if necessary, the organic solvent may additionally use any organic solvent commonly used in a non-aqueous electrolyte without limitation. For example, the organic solvent may further include at least one of an ether-based organic solvent, a glyme-based solvent, or a nitrile-based organic solvent.

As the ether-based solvent, any one selected from dimethyl ether, diethyl ether, dipropyl ether, methyl ethyl ether, methyl propyl ether, ethyl propyl ether, 1,3-dioxolane (DOL), or 2,2-bis (trifluoromethyl)-1,3-dioxolane (TFDOL), or a mixture of two or more thereof may be used, but the present disclosure is not limited thereto.

The glyme-based solvent is a solvent having a higher dielectric constant and lower surface tension than those of a linear carbonate-based organic solvent, and having less reactivity with metals, and may include at least one of dimethoxyethane (glyme, DME), diethoxyethane, digylme, triglyme, or tetra-glyme (TEGDME), but is not limited thereto.

The nitrile-based solvent may be one or more of acetonitrile, propionitrile, butyronitrile, valeronitrile, caprylonitrile, heptarenitrile, cyclopentane carbonitrile, cyclohexane carbonitrile, 2-fluorobenzonitrile, 4-fluorobenzonitrile, difluorobenzornitrile, trifluorobenzornitrile, phenylacetonitrile, 2-fluorophenylacetonitrile, or 4-fluorophenylacetonitrile, but is not limited thereto.

The non-aqueous electrolyte of the present disclosure may further include fluoroethylene carbonate (FEC) In terms of improving life characteristics at a high voltage. The fluoroethylene carbonate (FEC) may be included in an amount of 1 to 30 parts by weight, preferably 5 to 15 parts by weight, based on 100 parts by weight of the non-aqueous electrolyte.

In addition, the non-aqueous electrolyte of the present disclosure may include the compound of Formula 1 and fluoroethylene carbonate in a weight ratio of 1:1 to 1:30, preferably in a weight ratio of 1:2 to 1:25, and more preferably in a weight ratio of 1:3 to 1:15. When the compound of Formula 1 and fluoroethylene carbonate are included in the above relative ratio, the effect of improving lifespan and storage characteristics at a high voltage may be maximized.

In addition to the fluoroethylene carbonate, the non-aqueous electrolyte of the present disclosure may further include, if necessary, an electrolyte additive known in the art in the non-aqueous electrolyte to prevent the non-aqueous electrolyte from being decomposed in a high-output environment and causing a negative electrode to collapse, or to further improve low-temperature high-rate discharge properties, high-temperature stability, overcharge prevention, the effect of suppressing battery expansion at high temperatures, and the like Typical examples of the electrolyte additive may include at least one additional additive for forming an SEI film, and such additive may be selected from a cyclic carbonate-based compound, a sultone-based compound, a sulfate-based compound, a phosphate-based compound, a borate-based compound, a nitrile-based compound, a benzene-based compound, an amine-based compound, a silane-based compound, or a lithium salt-based compound.

The cyclic carbonate-based compound may be vinylene carbonate (VC) or vinylethylene carbonate.

The sultone-based compound may be at least one of 1,3-propane sultone (PS), 1,4-butane sultone, ethene sultone, 1,3-propene sultone (PRS), 1,4-butene sultone, or 1-methyl-1,3-propene sultone.

The sulfate-based compound may be ethylene sulfate (ESA), trimethylene sulfate (TMS) or methyl trimethylene sulfate (MTMS).

The phosphate-based compound may be one or more of lithium difluoro(bisoxalato)phosphate, lithium difluorophosphate, tetramethyl trimethyl silyl phosphate, trimethyl silyl phosphite, tris(2,2,2-trifluoroethyl)phosphate, or tris (trifluoroethyl)phosphite.

The borate-based compound may be tetraphenylborate, lithium oxalyldifluoroborate (LiODFB), or lithium bisoxalatoborate ($LiB(C_2O_4)_2$, LiBOB).

The nitrile-based compound may be at least one of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, or 4-fluorophenylacetonitrile.

The benzene-based compound may be fluorobenzene, the amine-based compound may be triethanolamine, ethylene diamine, or the like, and the silane-based compound may be tetravinylsilane.

The lithium salt-based compound is a compound different from the lithium salt included in the non-aqueous electrolyte, and may be lithium difluorophosphate (LiDFP), $LiPO_2F_2$, $LiBF_4$, or the like.

Among the electrolyte additives, when a combination of vinylene carbonate (VC), 1,3-propane sultone (PS), and ethylene sulfate (Esa) is included, it is possible to form a more robust SEI film on the surface of a negative electrode during the initial activation process of a secondary battery, and to suppress the generation of gas which may be generated due to the decomposition of an electrolyte at high temperatures, thereby improving high-temperature stability of the secondary battery.

Meanwhile, two or more of the electrolyte additives may be mixed and used, and may be 0.1 to 10 wt %, specifically 0.2 to 8 wt %, preferably 0.5 to 8 wt %, based on the total weight of the non-aqueous electrolyte. When the content of the electrolyte additives satisfies the above range, there is a more excellent effect of improving ion conductivity and cycle properties.

Lithium Secondary Battery

The present disclosure also provides a lithium secondary battery including the non-aqueous electrolyte.

Specifically, the lithium secondary battery includes a positive electrode including a positive electrode active material, a negative electrode including a negative electrode active material, a separator interposed between the positive electrode and the negative electrode, and the above-described non-aqueous electrolyte.

At this time, the lithium secondary battery of the present disclosure may be manufactured by a typical method known in the art. For example, the lithium secondary battery of the present disclosure may be manufactured by forming an electrode assembly in which a positive electrode, a negative electrode, and a separator between the positive electrode and the negative electrode are sequentially stacked, followed by inserting the electrode assembly in a battery case, and then injecting the non-aqueous electrolyte according to the present disclosure thereto.

The lithium secondary battery of the present disclosure has a driving voltage of 4.47V or higher and may be driven at a high voltage.

(1) Positive Electrode

The positive electrode may be manufactured by coating a positive electrode mixture slurry including a positive electrode active material, a binder, a conductive material, a solvent, and the like on a positive electrode current collector.

The positive electrode current collector is not particularly limited as long as it has conductivity without causing a chemical change in the battery. For example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, and specifically, may include a lithium metal oxide including one or more metals such as cobalt, manganese, nickel, or aluminum, and lithium. More specifically, the lithium metal oxide may be a lithium-manganese-based oxide (e.g., $LiMnO_2$, $LiMn_2O_4$, etc.), a lithium-cobalt-based oxide (e.g., $LiCoO_2$, etc.), a lithium-nickel-based oxide (e.g., $LiNiO_2$, etc.), a lithium-nickel-manganese-based oxide (e.g., $LiNi_{1-Y}Mn_YO_2$ (wherein $0<Y<1$), $LiMn_{2-Z}Ni_ZO_4$ (wherein $0<Z<2$, etc.), a lithium-nickel-cobalt-based oxide (e.g., $LiNi_{1-Y1}Co_{Y1}O_2$ (wherein $0<Y1<1$, etc.), a lithium-manganese-cobalt-based oxide (e.g., $LiCo_{1-Y2}Mn_{Y2}O_2$ (wherein $0<Y2<1$), $LiMn_{2-Z1}Co_{Z1}O_4$ (wherein $0<Z1<2$, etc.), a lithium-nickel-manganese-cobalt-based oxide (e.g., $Li(Ni_pCo_qMn_r)O_2$ (wherein $0<p<1$, $0<q<1$, $0<r<1$, $p+q+r=1$) or $Li(Ni_{p1}Co_{q1}Mn_{r1})O_4$ (wherein $0<p1<2$, $0<q1<2$, $0<r1<2$, $p1+q1+r1=2$, etc.), or a lithium-nickel-cobalt-transition metal (M) oxide (e.g., $Li(Ni_{p2}Co_{q2}Mn_{r2}M_{s2})O_2$ (wherein M is selected from Al, Fe, V, Cr, Ti, Ta, Mg or Mo, and p2, q2, r2 and s2 are each an atomic fraction of stand-alone elements, wherein $0<p2<1$, $0<q2<1$, $0<r2<1$, $0<s2<1$, $p2+q2+r2+s2=1$, etc.) and the like, and any one thereof or a compound of two or more thereof may be included.

Among these, due to the fact that the capacity properties and stability of a battery may be increased, the lithium metal oxide may be $LiCoO_2$, $LiMnO_2$, $LiNiO_2$, a lithium nickel-manganese-cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$ and $Li(Ni_{0.8}Mn_{0.1}Co_{0.1})O_2$, etc.), a lithium nickel-aluminum-cobalt oxide (e.g., $Li(Ni_{0.8}Co_{0.15}Al_{0.05})O_2$, etc.), a lithium-nickel-manganese-cobalt aluminum oxide (e.g., $Li(Ni_{0.86}Co_{0.05}Mn_{0.07}Al_{0.02})O_2$), or the like, and any one thereof or a mixture of two or more thereof may be used.

Among the above, a positive electrode active material may be a lithium cobalt-based oxide represented by Formula 2 below.

$$Li_{a1}Co_{1-x1}M^1_{x1}O_{2+\beta} \quad \text{[Formula 2]}$$

In Formula 2 above, $M^1$ may include one or more of Al, B, Ba, Ca, Zr, Ti, Mg, Ta, Nb, Sr, W or Mo, wherein $0.9<a1\leq1.1$, $0\leq x1\leq0.2$, $0\leq\beta\leq0.02$.

The positive electrode active material may be included in an amount of 60 wt % to 99 wt %, preferably 70 wt % to 99 wt %, more preferably 80 wt % to 98 wt %, based on the total weight of the solids excluding the solvent in the positive electrode mixture slurry.

The binder is a component for assisting in coupling between an active material and a conductive material, and coupling to a current collector.

Examples of the binder may include polyvinylidene fluoride, polyvinyl alcohol, carboxymethylcellulose (CMC), starch, hydroxypropyl cellulose, regenerated cellulose, polyvinylpyrrolidone, polytetrafluoroethylene, polyethylene (PE), polypropylene, an ethylene-propylene-diene monomer, a sulfonated ethylene-propylene-diene monomer, styrene-butadiene rubber, fluorine rubber, or various copolymers thereof.

Typically, the binder may be included in an amount of 1 to 20 wt %, preferably 1 to 15 wt %, more preferably 1 wt % to 10 wt %, based on the total weight of the solids excluding the solvent in the positive electrode mixture slurry.

The conductive material is a component for further improving the conductivity of the positive electrode active material, and may be added in an amount of 1 to 20 wt % based on the total weight of the solids in the positive electrode mixture slurry. The conductive material is not particularly limited as long as it has conductivity without causing a chemical change in the battery, and for example, carbon powder such as carbon black, acetylene black, Ketjen black, channel black, furnace black, lamp black, or thermal black; graphite powder such as natural graphite with a well-developed crystal structure, artificial graphite, graphite, or the like; conductive fibers such as carbon fiber or metal fiber; conductive powder such as fluorocarbon powder, aluminum powder, or nickel powder; a conductive whiskers such as zinc oxide or potassium titanate; conductive metal oxides such as titanium oxide; conductive materials such as a polyphenylene derivative, or the like may be used.

Typically, the conductive material may be included in an amount of 1 to 20 wt %, preferably 1 to 15 wt %, more preferably 1 wt % to 10 wt %, based on the total weight of the solids excluding the solvent in the positive electrode mixture slurry.

The solvent may include an organic solvent such as N-methyl-2-pyrrolidone (NMP), and may be used in an amount such that a preferred viscosity is achieved when the positive electrode active material, and selectively, a binder, a conductive material, and the like are included. For example, the solvent may be included in an amount such that the concentration of a solid including the positive electrode active material, and selectively the binder and the conductive material is 50 wt % to 95 wt %, preferably 70 wt % to 95 wt %, more preferably 70 wt % to 90 wt %.

(2) Negative Electrode

The negative electrode may be manufactured by, for example, coating a negative electrode mixture slurry containing a negative electrode active material, a binder, a conductive material, a solvent, and the like on a negative electrode current collector, or a graphite electrode made of carbon (C) or a metal itself may be used as the negative electrode.

For example, when the negative electrode is manufactured by coating a negative electrode mixture slurry on a negative electrode current collector, the negative electrode current collector generally has a thickness of 3 to 500 μm. The negative electrode current collector is not particularly limited as long as it has high conductivity without causing a chemical change in the battery, and for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, as in the positive electrode current collector, microscopic irregularities may be formed on the surface to improve the binding force of a negative electrode active material, and the negative electrode current collector may be used in various shapes such as a film, a sheet, a foil, a net, a porous body, a foam body, and a non-woven fabric body.

Furthermore, the negative electrode active material may include at least one of lithium metal, a carbon material capable of reversibly intercalating/deintercalating lithium ions, metal or an alloy of lithium and the metal, a metal composite oxide, a material which may be doped and undoped with lithium, or a transition metal oxide.

As the carbon material capable of reversibly intercalating/deintercalating the lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, or fired cokes.

As the metal or the alloy of lithium and the metal, a metal selected from Cu, Ni, Na, K, Rb, Cs, Fr, Be, Mg, Ca, Sr, Si, Sb, Pb, In, Zn, Ba, Ra, Ge, Al or Sn, or an alloy of lithium and the metal may be used.

One selected from PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$) or $Sn_xMe_{1-x}Me'_yO_z$ (Me: Mn, Fe, Pb, Ge; Me': Al, B, P, Si, Groups I, II and III elements of the periodic table, or halogen; $0 < x \le 1$; $1 \le y \le 3$; $1 \le z \le 8$) may be used as the metal composite oxide.

The material, which may be doped and undoped with lithium, may include Si, $SiO_x$ ($0 < x \le 2$), a Si—Y alloy (where Y is an element selected from alkali metal, alkaline earth metal, a Group 13 element, a Group 14 element, transition metal, a rare earth element, or a combination thereof, and is not Si), Sn, $SnO_2$, and Sn—Y (where Y is an element selected from alkali metal, alkaline earth metal, a Group 13 element, a Group 14 element, transition metal, a rare earth element, or a combination thereof, and is not Sn), and a mixture of $SiO_2$ and at least one thereof may also be used. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po or a combination thereof.

The transition metal oxide may include lithium-containing titanium composite oxide (LTO), vanadium oxide, or lithium vanadium oxide.

Among these, the negative electrode of the present disclosure may include any one or more of Si, Si—C, or $SiO_x$ ($0 < x \le 2$) as a negative electrode active material. Preferably, the negative electrode active material may be a mixture of graphite and $SiO_x$ ($0 < x \le 2$). In terms of increasing the capacity of a lithium secondary battery, graphite and $SiO_x$ ($0 < x \le 2$) may be included in a weight ratio of 97:3 to 70:30.

The negative electrode active material may be present in an amount of 60 wt % to 99 wt %, preferably 70 wt % to 99 wt %, more preferably 80 wt % to 98 wt %, based on the total weight of the solids in the negative electrode mixture slurry.

The binder is a component that assists in the binding between the conductive agent, the active material, and the current collector. Examples of the binder may be polyvinylidene fluoride (PVDF), polyvinyl alcohol, carboxymethylcellulose (CMC), starch, hydroxypropyl cellulose, regenerated cellulose, polyvinylpyrrolidone, polytetrafluoroethylene, polyethylene, polypropylene, an ethylene-propylene-diene monomer, a sulfonated ethylene-propylene-diene monomer, styrene-butadiene rubber, fluorine rubber, or various copolymers thereof.

Typically, the binder may be included in an amount of 1 to 20 wt %, preferably 1 to 15 wt %, more preferably 1 wt % to 10 wt %, based on the total weight of solids excluding the solvent in the negative electrode mixture slurry.

The conductive agent is a component for further improving the conductivity of the negative electrode active material, wherein the conductive agent may be added in an amount of 1 wt % to 20 wt % based on the total weight of the solids in the negative electrode mixture slurry. Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; conductive powder such as fluorocarbon powder, aluminum powder, or nickel powder; conductive whiskers such as zinc oxide whiskers or potassium titanate whiskers; conductive metal oxide such as titanium oxide; or polyphenylene derivatives, may be used.

The conductive agent may be included in an amount of 1 wt % to 20 wt %, preferably 1 to 15 wt %, more preferably 1 wt % to 10 wt %, based on the total weight of the solids excluding the solvent in the negative electrode mixture slurry.

The solvent may include water or an organic solvent such as NMP (N-methyl-2-pyrrolidone), and may be used in an amount such that desirable viscosity is obtained when the negative electrode active material as well as optionally the binder and the conductive agent are included. For example, the solvent may be included in an amount such that a concentration of the solid content in the negative electrode slurry including the negative electrode active material as well as optionally the binder and the conductive agent is in a range of 50 wt % to 95 wt %, preferably 70 wt % to 90 wt %.

As the negative electrode, when a metal itself is used, the negative electrode maybe manufactured by physically bonding, roll-pressing, or depositing a metal on a metal thin film itself or the negative electrode current collector. The depositing method may be electrical vapor deposition or chemical vapor deposition.

For example, the metal bonded/roll-pressed/deposited on the metal thin film itself or the negative electrode current collector may include one type of metal selected from lithium (Li), nickel (Ni), tin (Sn), copper (Cu), or indium (In), or an alloy of two types of metals thereof.

(3) Separator

In addition, as the separator, a common porous polymer film typically used as a separator, for example, a porous polymer film prepared with a polyolefin-based polymer, such as an ethylene homocopolymer, a propylene homocopolymer, an ethylene/butene copolymer, an ethylene/hexene copolymer, and an ethylene/methacrylate copolymer may be used alone, or in a laminated form thereof. Alternatively, a typical porous non-woven fabric, for example, a non-woven fabric formed of a glass fiber having a high melting point or polyethylene terephthalate fiber may be used, but the present disclosure is not limited thereto. Also, a coated separator including a ceramic component or a polymer material may be used to secure heat resistance or mechanical strength, and may be selectively used in a single-layered or a multi-layered structure.

A shape of the lithium secondary battery of the present disclosure is not particularly limited, but a cylindrical type using a can, a prismatic type, a pouch type, or a coin type may be used.

Hereinafter, the present disclosure will be described in more detail according to examples. However, the invention may be embodied in many different forms and should not be construed as being limited to the embodiments set forth herein. Rather, these example embodiments are provided so that this description will be thorough and complete, and will fully convey the scope of the present disclosure to those skilled in the art.

EXAMPLES

Example 1

(Preparation of Non-Aqueous Electrolyte)

A non-aqueous solvent was prepared by using an organic solvent (ethylene carbonate (EC):ethylmethyl carbonate (EMC)=30:70 volume ratio) to dissolve $LiPF_6$ to be 1.0M and to 89 g of the non-aqueous solvent, 1 g of a compound of Formula 1a below and 10 g of fluoroethylene carbonate (FEC) were introduced to prepare a non-aqueous electrolyte.

[Formula 1a]

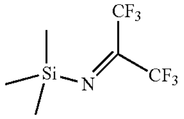

(Manufacturing of Lithium Secondary Battery)

A positive electrode active material ($LiCoO_2$): a conductive material (carbon black): a binder (polyvinylidene fluoride) were added in a weight ratio of 97.5:1.3:1.2 to N-methyl-2-pyrrolidone (NMP), which was a solvent, to prepare a positive electrode slurry (solid content 74 wt %). The positive electrode slurry was applied on one surface of a positive electrode current collector (Al thin film) having a thickness of 130 μm, dried and then roll-pressed to manufacture a positive electrode.

A negative electrode active material (graphite:SiO=92:8 weight ratio), a conductive material (carbon black) and a binder (polyvinylidene fluoride) were added in a weight ratio of 96.8:0.2:3.0 to N-methyl-2-pyrrolidone (NMP), which was a solvent, to prepare a negative electrode slurry (solid content 60 wt %). The negative electrode slurry was applied on one surface of a negative electrode current collector (Cu thin film) having a thickness of 128 μm, dried and then roll-pressed to prepare a negative electrode.

In a dry room, a polyolefin-based porous polymer separator prepared from polyolefin polymers was interposed between the positive electrode and the negative electrode manufactured above, and then the prepared non-aqueous electrolyte was injected thereto to prepare a secondary battery.

Example 2

A secondary battery was prepared in the same manner as in Example 1 except that 1 g of the compound of Formula 1b below and 10 g of fluoroethylene carbonate (FEC) were introduced to 89 g of the non-aqueous solvent prepared in Example 1 to prepare a non-aqueous electrolyte.

[Formula 1b]

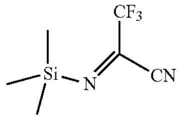

Example 3

A secondary battery was prepared in the same manner as in Example 1 except that 1 g of the compound of Formula 1c below and 10 g of fluoroethylene carbonate (FEC) were introduced to 89 g of the non-aqueous solvent prepared in Example 1 to prepare a non-aqueous electrolyte.

[Formula 1c]

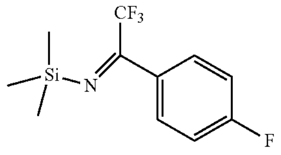

Example 4

A secondary battery was prepared in the same manner as in Example 1 except that 0.5 g of the compound of Formula 1a above and 10 g of fluoroethylene carbonate (FEC) were introduced to 89.5 g of the non-aqueous solvent prepared in Example 1 to prepare a non-aqueous electrolyte.

Example 5

A secondary battery was prepared in the same manner as in Example 1 except that 2 g of the compound of Formula 1a above and 10 g of fluoroethylene carbonate (FEC) were introduced to 88 g of the non-aqueous solvent prepared in Example 1 to prepare a non-aqueous electrolyte.

Comparative Example 1

A secondary battery was prepared in the same manner as in Example 1 except that 100 g of the non-aqueous solvent prepared in Example 1 was used to prepare a non-aqueous electrolyte.

Experimental Example 1—Evaluation of High-Temperature Cycle Properties

For each of the secondary batteries prepared in Examples 1 to 5 and Comparative Example 1, the cycle properties were evaluated.

Specifically, each of the batteries prepared in Examples 1 to 5 and Comparative Example 1 was charged to 4.47 V with a constant current of 1 C at 45° C., and then discharged to 3.11 V with a constant current of 0.5 C, which was set as one cycle, and then 600 cycles of the charging/discharging were performed to measure a capacity retention rate based on the initial capacity after 1 cycle was performed. The results are shown in Table 1 below.

TABLE 1

| | Capacity retention rage (%) |
|---|---|
| Example 1 | 78.8 |
| Example 2 | 78.2 |
| Example 3 | 76.5 |
| Example 4 | 77.3 |
| Example 5 | 76.9 |
| Comparative Example 1 | 64.6 |

As shown in Table 1, Examples 1 to 5 in which the additive for a non-aqueous electrolyte of the present disclosure was used had a higher capacity retention rate than that of Comparative Example 1 in which the additive was not used, and thus, had excellent lifespan properties.

Experimental Example 2—Evaluation of High-Temperature Storage Properties

For each of the secondary batteries prepared in Examples 1 to 5 and Comparative Example 1, the high-temperature storage properties were evaluated.

Specifically, the secondary batteries of Examples 1 to 5 and Comparative Example 1 were each fully charged to 4.47 V, and then stored at 60° C. for 6 weeks.

Before the storage, the capacity of each of the fully-charged secondary batteries was measured and then set as an initial capacity of the secondary battery.

After 6 weeks, the capacity of each of the stored batteries was measured to calculate a capacity reduced during the 6-week storage period. The percentage ratio of the reduced capacity to the initial capacity of the secondary battery was calculated to derive a capacity retention rate after 6 weeks. The results are shown in Table 2 below.

TABLE 2

| | Capacity retention rate (%) |
|---|---|
| Example 1 | 84.8 |
| Example 2 | 83.6 |
| Example 3 | 82.9 |
| Example 4 | 83.2 |
| Example 5 | 83.1 |
| Comparative Example 1 | 78.5 |

As shown in Table 2 above, it was confirmed that the secondary batteries of Examples 1 to 5 had a higher retention rate after 6 weeks than that of the secondary battery of Comparative Example 1, and thus, had stable performance at high temperatures.

The invention claimed is:

1. A non-aqueous electrolyte, comprising a lithium salt; an organic solvent; and a compound represented by Formula 1 as an additive:

[Formula 1]

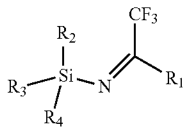

wherein in Formula 1, $R_1$ is selected from an alkyl group having 1 to 5 carbon atoms and being substituted with a fluorine, an aryl group having 6 to 8 carbon atoms and being substituted with a fluorine, or a nitrile group; and $R_2$ to $R_4$ are each independently an alkyl group having 1 to 5 carbon atoms, provided when $R_2$ to $R_4$ are each methyl, $R_1$ is an alkyl group having 1 to 5 carbon atoms and being substituted with at least three fluorine atoms, or an aryl group haivng 6 to 8 carbon atoms and being substituted with a fluorine.

2. The non-aqueous electrolyte of claim 1, wherein in Formula 1, $R_1$ is $CF_3$.

3. The non-aqueous electrolyte of claim 1, wherein in Formula 1, $R_1$ is a nitrile group, and $R_2$ to $R_4$ are each independently an alkyl group having 2 to 5 carbon atoms.

4. The non-aqueous electrolyte of claim 1, wherein the compound is represented by Formula 1-1:

[Formula 1-1]

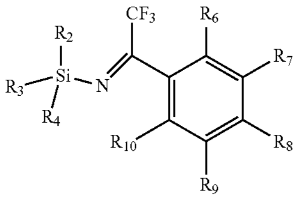

wherein in Formula 1-1, $R_2$ to $R_4$ are each independently an alkyl group having 1 to 5 carbon atoms; $R_6$ to $R_{10}$ are each independently H or F; and at least one of $R_6$ to $R_{10}$ is F.

5. The non-aqueous electrolyte of claim 1, wherein the compound is represented by Formula 1a or Formula 1c:

[Formula 1a]

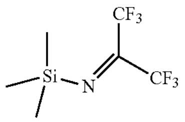

[Formula 1c]

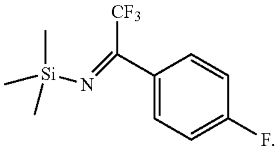

6. The non-aqueous electrolyte of claim 1, wherein the compound is included in an amount of 0.1 parts by weight to 4 parts by weight, based on 100 parts by weight of the non-aqueous electrolyte.

7. The non-aqueous electrolyte of claim 1, which further comprises fluoroethylene carbonate (FEC).

8. The non-aqueous electrolyte of claim 7, wherein the fluoroethylene carbonate (FEC) is included in an amount of 1 to 30 parts by weight, based on 100 parts by weight of the non-aqueous electrolyte.

9. The non-aqueous electrolyte of claim 7, wherein the compound and the fluoroethylene carbonate are included in a weight ratio of 1:1 to 1:30.

10. The non-aqueous electrolyte of claim 1, wherein the lithium salt is one or more of LiCl, LiBr, LiI, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$, $LiN(SO_2CF_2CF_3)_2$ or $LiN(SO_2CF_3)_2$.

11. The non-aqueous electrolyte of claim 1, wherein the lithium salt is included at a concentration of 0.5 M to 3 M.

12. A lithium secondary battery comprising a positive electrode, a negative electrode, and the non-aqueous electrolyte of claim 1, wherein the lithium secondary battery has a driving voltage of 4.47V or higher.

13. The lithium secondary battery of claim 12, wherein the positive electrode comprises a lithium cobalt-based oxide as a positive electrode active material.

14. The lithium secondary battery of claim 12, wherein the negative electrode comprises one or more of Si, Si—C, or $SiO_x$ ($0<x\leq 2$) as a negative electrode active material.

* * * * *